Figure 1:
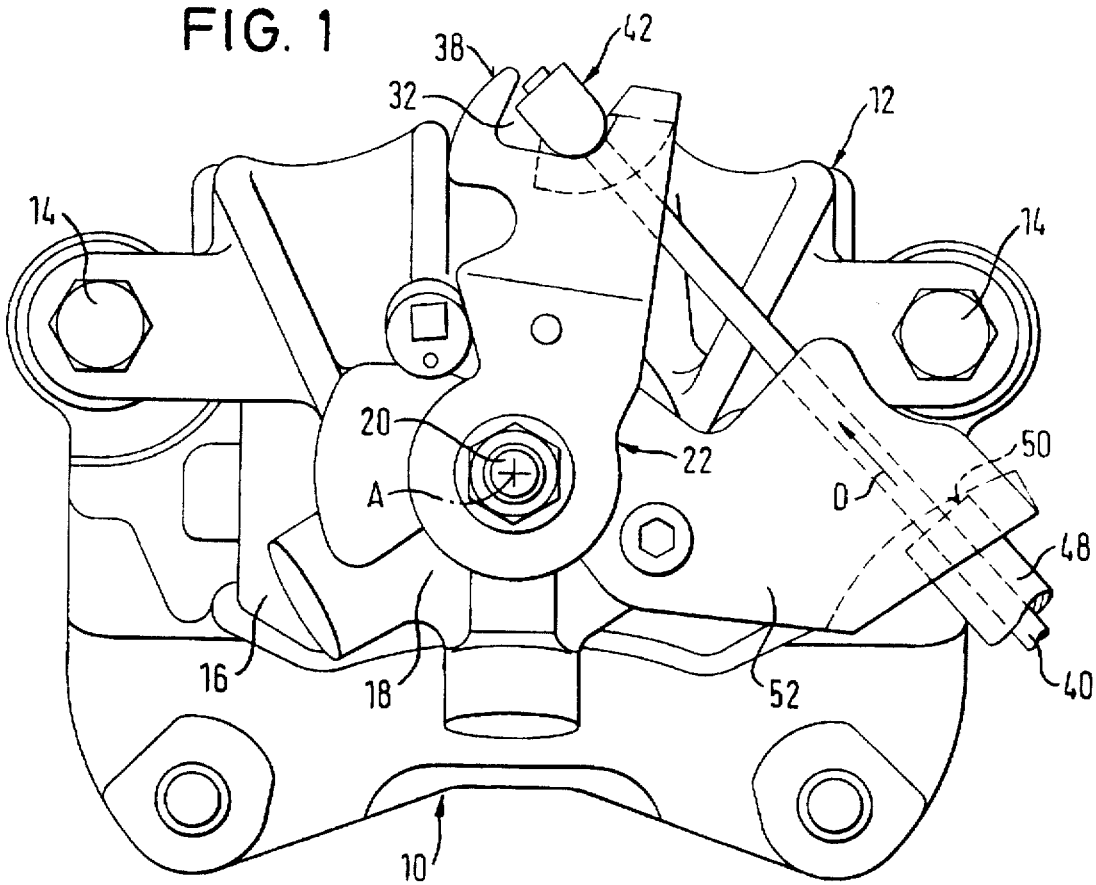

United States Patent [19]

Wagner et al.

[11] Patent Number: 5,671,639
[45] Date of Patent: Sep. 30, 1997

[54] MECHANICAL OPERATING MECHANISM, IN PARTICULAR FOR MOTOR VEHICLE BRAKES

[75] Inventors: Lothar Wagner, Steinefrenz; Frank Madzgalla, Koblenz, both of Germany

[73] Assignee: Lucas Industries public limited company, West Midlands, United Kingdom

[21] Appl. No.: 602,759

[22] PCT Filed: Sep. 14, 1994

[86] PCT No.: PCT/EP94/03073

§ 371 Date: Feb. 20, 1996

§ 102(e) Date: Feb. 20, 1996

[87] PCT Pub. No.: WO95/08719

PCT Pub. Date: Mar. 30, 1995

[30] Foreign Application Priority Data

Sep. 22, 1993 [DE] Germany .................. 9314350 U

[51] Int. Cl.6 .................. F16C 1/12; F16D 65/22
[52] U.S. Cl. .................. 74/502.6; 188/2 D
[58] Field of Search .................. 74/502.6, 500.5; 188/2 D, 106 F, 106 A, 370

[56] References Cited

U.S. PATENT DOCUMENTS

| 4,069,721 | 1/1978 | Ezaki et al. | |
| 4,753,325 | 6/1988 | Jaksic | 188/2 D |
| 4,872,533 | 10/1989 | Boyer et al. | 188/2 D |
| 4,930,605 | 6/1990 | Boyer et al. | 188/2 D |
| 4,974,708 | 12/1990 | Maligne | 74/502.6 X |
| 5,002,159 | 3/1991 | Brix et al. | 188/2 D |
| 5,137,120 | 8/1992 | Barbosa | 188/2 D |
| 5,142,935 | 9/1992 | Carr . | |

FOREIGN PATENT DOCUMENTS

| 0142421A | 5/1985 | European Pat. Off. . |
| 0184092A | 6/1986 | European Pat. Off. . |
| 0311346A | 4/1987 | European Pat. Off. . |
| 0403635B1 | 7/1990 | European Pat. Off. . |
| 68707917 U | 11/1987 | Germany . |

Primary Examiner—Richard M. Lorence
Attorney, Agent, or Firm—Wood, Herron & Evans L.L.P.

[57] ABSTRACT

A lever 22, which comprises a slot 28 and an abutment 30, is supported on a housing 18 so as to pivot about a pivot axis A. A cable 40, which is supported against the abutment 30 via an enlarged butt end 42, is placed in position in the slot 28, such that the lever 22 can be pivoted by a pulling force C of the cable. The lever 22 comprises a projection 34 which, in extension of the cable 40 and defining an intermediate space 32, is disposed opposite the abutment 30. The end 42 is accommodated in the intermediate space 32 and is supported against the projection 34 for transmitting a pushing force D of the cable. The projection is provided, at its side facing away from the abutment 30, with a ramp 38, on to which ramp the end 42 of the cable 40 is adapted to be placed, when the cable is inserted in the slot, and from which ramp the end 42 slides downward into the intermediate space 32 when a pulling force C is exerted on the cable. As a result, the assembly of the operating mechanism, in particular in a motor vehicle, is simplified.

4 Claims, 1 Drawing Sheet

MECHANICAL OPERATING MECHANISM, IN PARTICULAR FOR MOTOR VEHICLE BRAKES

The invention relates to a mechanical operating mechanism, in particular for motor vehicle brakes, comprising a lever which is mounted on a housing to pivot about a pivot axis and is provided with a slot and an abutment, and comprising a cable which is placed in position in the slot and has a butt end which is supported against the abutment, such that the lever can be caused to pivot by tensioning the cable.

Mechanical operating mechanisms of this kind are installed, for example, for parking brake systems in motor vehicles. A disc brake, which is actuated hydraulically for service brake systems and actuated by an operating mechanism of the kind mentioned above for parking brake systems, is known from EP 0 403 635. The brake comprises a housing, in which is provided an hydraulic cylinder and on which is supported a shaft which has a common axis with the cylinder. A lever for parking braking is attached to one shaft end which projects out of the housing, said lever comprising an end section which is spaced away from the shaft and is provided with a limb which projects radially in an outward direction and with a limb which is bent backward. A slot is provided between these two limbs, into which slot a cable of a Bowden mechanism can be placed. The two limbs have lateral faces adjacent to the slot and the lateral faces jointly form an abutment for a butt end of the cable. Said abutment is shaped such that it provides a reliable support for the butt end, when and while the cable is at least partially tensioned. When an operating mechanism of this kind is installed in a motor vehicle, the Bowden mechanism is adjusted such that the cable is at least slightly tensioned in the non-operating state, such that lost motion is substantially prevented when the brake is actuated mechanically.

Such operating mechanisms are usually assembled with the unit at the site of manufacture of the unit which is to be operated, for example a motor vehicle brake, and are delivered, together with said unit, to the place of installation, for example a conveyor belt in the plant of a motor vehicle manufacturer, where that end region of the Bowden mechanism which is spaced away from the brake, or the like, is connected to an associated operating member, for example a hand-brake lever, a balance-beam-like intermediate member usually being arranged between said hand-brake lever and two Bowden mechanisms for, in each case, one rear-wheel brake, which intermediate member ensures an equal distribution of force to the two brakes. It is possible, during the assembling procedures which must be carried out in this region, that, instead of a pulling force, a pushing force is temporarily exerted on a cable of an operating mechanism of the kind mentioned. If, in that case, the cable is displaced in the associated Bowden mechanism, it is possible for that end which is associated with the brake, or the like, to move away from the abutment such that, during the subsequent tensioning of the cable, the butt end slides out of the associated slot and does not return to the abutment. It is then necessary for the cable to be loosened, to place it again in position in the slot of the lever, and to ensure that the butt end rests against the abutment, prior to a renewed tensioning of the cable from the other end which is adjacent to the brake rod or the like.

The invention is based on the object of simplifying the assembly of mechanical operating mechanisms of the kind mentioned at the outset, in particular their installation in a motor vehicle.

According to the invention, this object is met in that the lever is provided with a projection which, in extension of the cable and forming an intermediate space, is disposed opposite the abutment, and the end is accommodated in the intermediate space and is supported against the projection for the transmission of the pushing force of the cable.

As a result, it is ensured that the cable can no longer be detached unintentionally from the lever. Nonetheless, if required, the cable is readily removed in that it is bent in a region which adjoins the butt end such that the end is moved past the projection, whereupon it is then possible for the cable to be pushed out of the slot without any difficulty.

Advantageous developments of the invention result from the subclaims.

Figure 2:
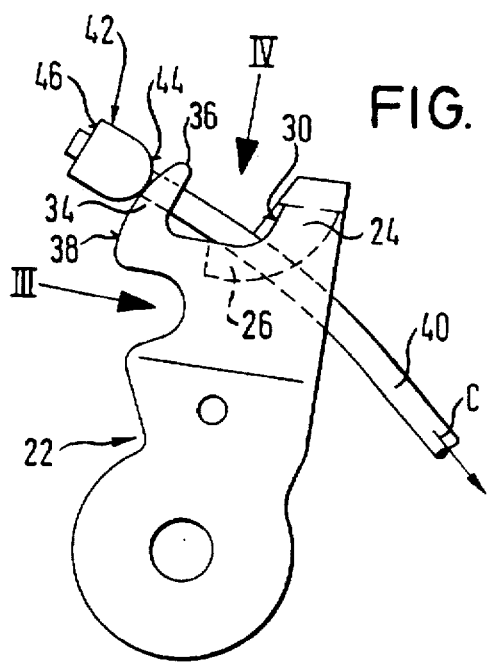
Figure 3:
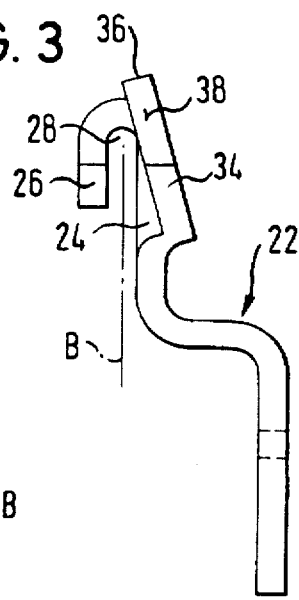
Figure 4:
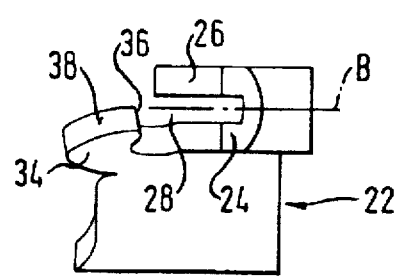

An exemplified embodiment of the invention is described in more detail hereinafter with reference to diagrammatic drawings, in which:

FIG. 1 shows a side view of a motor vehicle disc brake which is provided with the operating mechanism according to the invention, FIG. 2 shows details of FIG. 1, FIG. 3 shows the view in the direction of the arrow III in FIG. 2, and FIG. 4 shows the view in the direction of the arrow IV in FIG. 2.

The motor vehicle brake illustrated is a spot-type disc brake comprising a brake anchor plate 10, which encompasses the radially outer edge of a brake disc, which is not illustrated, and comprising a floating caliper 12, which is guided on a pair of bolts to be displaceable on the brake anchor plate 10 parallel to the axis of the brake disc, and which also encompasses the brake disc and, additionally, a pair of brake shoes 16. The floating caliper 12 comprises a housing 18 in which a cylinder for hydraulic brake actuation is arranged and in which a shaft 20 is supported. The shaft 20 comprises an end which projects out of the housing 18 and on which is supported a lever 22 which projects essentially radially away from said shaft. The shaft 20 is arranged parallel to the two bolts 14; its geometric axis is, hereinafter, referred to as pivot axis A of the lever 22. Up to this point, the illustrated brake is of the typical construction, for example according to EP 0 403 635 B1 mentioned at the outset.

The lever 22 is punched out of sheet steel and, viewed in the direction of its pivot axis A according to FIGS. 1 and 2, has approximately the shape of an open-end wrench with a right-hand prong which is folded such that is has a limb 24, which extends away from the pivot axis A substantially radially, and a limb 26, which is bent over backward. A slot 28, in a plane B which is normal relative to the pivot axis A, is left open between these limbs 24 and 26. The two edges of the two limbs 24 and 26, which edges are adjacent to the slot 28 and face to the left-hand side in FIGS. 1 and 2, jointly form a concave abutment 30.

Separated from the abutment 30 by an intermediate space 32, the lever comprises a projection 34 which, when viewed as in FIGS. 1 and 2, forms the left-hand prong of the lever 22, which resembles an open-end wrench, and tapers in the direction of its free end 36. According to FIGS. 3 and 4, the lever 22, as a whole, is cranked; additionally, the projection 34 is curved in the direction of the plane B such that its free end 36 is disposed approximately opposite the slot 28. A ramp 38, which constitutes a reference cylinder surface having an axis of curvature which is parallel to the pivot axis A, is provided on that side of the projection 34 which faces away from the intermediate space 32. According to FIG. 2, the axis of curvature relative to the pivot axis A is disposed radially within the cable 40.

A cable 40 is placed in position in The slot 28, relative to the lever 22 radially from The interior, said cable having a butt end 42. In the completely assembled state, according to FIG. 1, the end 42 is disposed in the intermediate space 32, having been accommodated essentially free of play between The abutment 30 and the projection 34. The end 42 is designed to be dynamically balanced in the usual manner relative to the cable 40 and comprises a semispherical surface area 44, which abuts against the abutment 30, and a flat end surface 46 at its opposite end. The cable 40, together with a sheathing 48, which is indicated in FIG. 1, constitutes a commercial Bowden cable. The sheathing 48 is supported in the usual manner on its own annular abutment 50 which, in the exemplified embodiment illustrated, is provided on a plate 52 which is attached to the housing 18.

In order to install the cable 40, it is first pushed through the abutment 50, which may also be provided with a slot, and the cable is then, as shown in FIG. 2, pushed past the rear side of the lever 22, said rear side facing away from the observer, and is finally placed in position in the slot 28 from below, i.e. radially outward from within relative to the pivot axis A. In doing so, the end 42 assumes a position which is to the left-hand side, to a greater or lesser extent, of the ramp 38. A pulling force C is then exerted on the cable 40, such that the end 42, with its semispherical surface 44, abuts against the ramp 38. In doing so, the end 42 tends to glide in the direction of the free end of the ramp 38. This tendency is promoted in that the sheathing 48 is secured to its abutment 50 and, accordingly, endeavours to keep the cable 40 in the position shown in FIG. 1. In order to place the cable in position in the slot 28 according to FIG. 2, the cable has been bent in a downward direction out of the aforementioned position, whereby resilient restoring forces are generated in the cable and these support the movement of the end 42 in the direction of the free end 36 of the projection 34.

By virtue of the aforegoing, the pulling force C exerted on the cable 40 in the final analysis causes the end 42 to engage in the intermediate space 32 and to be arrested there between the abutment 30 and the projection 34. If now, for example during the installation of the brake and its operating mechanism in a motor vehicle, a pushing force D is exerted on the cable 40, the end 42 is securely held in the intermediate space 32; it is thus not possible for the cable 40 to be detached unintentionally from the lever 22. If, however, the Bowden cable 40, 48 is to be dismantled and the cable 40 has, to that end, been loosened from its other end, for example from the end adjacent to a brake rod, it is simple to push the end 42 to the side past the projection 34, for example by inserting a screw driver in the intermediate space 32, and then pushing the cable 40 out of the slot 28.

We claim:

1. Mechanical operating mechanism for motor vehicle brakes, comprising
    a lever (22) which is mounted on a housing (18) to pivot about a pivot axis (A),
    a first limb (24) which is formed on the lever (22) and extends approximately radially away from the pivot axis (A) and from which a second limb (26) is bent over,
    a slot (28) left open between the first and second limbs (24, 26) which has a central plane (B) normal to the pivot axis (A),
    an abutment (30) formed by edges of the first and second limbs (24, 26),
    a projection (34) provided on the lever (22) and disposed opposite the abutment (3) such as to form an intermediate space (32), the projection comprising a ramp (38) facing away from said intermediate space (32),
    a cable (40) which is adapted to be placed in the slot (28) and has a butt end (42) which is adapted to be supported against the ramp (38) and which, when a pulling force (C) is exerted on the cable (40), is adapted to be moved across the ramp (38) to a position wherein the end (42) is received in the intermediate space (32), for transmitting the pulling force (C) to the abutment (30); whereby the projection (34) helps to retain the butt end (42) within the intermediate space (32) in the event of a cable (D) pushing force, characterized in that the projection (34) is bent in the direction of the central plane (B) of the slot (28) and has a free end (36) which is opposite the slot (28).

2. Operating mechanism according to claim 1 characterized in that the lever (22) is punched out of sheet steel.

3. Operating mechanism according to claim 2, characterized in that the lever (22), when viewed in the direction of its pivot axis (A), has the shape of an open-end wrench the prongs of which are formed by the projection (34) and by the abutment (30).

4. Operating mechanism according to claim 3, characterized in that at least one free end (34) of the projection (34) is curved in the direction of a central plane (B) of the slot (28), which plane is normal relative to the pivot axis (A).

* * * * *